US011574015B2

(12) United States Patent
Oswald et al.

(10) Patent No.: US 11,574,015 B2
(45) Date of Patent: Feb. 7, 2023

(54) NATURAL LANGUAGE INTERACTION BASED DATA ANALYTICS (71) Applicant: International Business Machines Corporation, Armonk, NY (US)

(72) Inventors: Richard John Oswald, Chicago, IL (US); Vikremjeet Singh Bhagi, Chicago, IL (US); Jing-Yun Shyr, Naperville, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 476 days.

(21) Appl. No.: 16/735,141

(22) Filed: Jan. 6, 2020

(65) Prior Publication Data

US 2021/0209168 A1 Jul. 8, 2021

(51) Int. Cl.
*G06F 16/9032* (2019.01)
*G06F 40/30* (2020.01)
*G06F 40/47* (2020.01)

(52) U.S. Cl.
CPC ........ *G06F 16/90332* (2019.01); *G06F 40/30* (2020.01); *G06F 40/47* (2020.01)

(58) Field of Classification Search
None
See application file for complete search history.

(56) References Cited

U.S. PATENT DOCUMENTS

| 8,015,143 | B2 | 9/2011 | Estes |
| 8,630,961 | B2 | 1/2014 | Beilby et al. |
| 8,949,377 | B2 | 2/2015 | Makar et al. |
| 11,055,355 | B1* | 7/2021 | Monti ............... G06F 16/90332 |
| 2002/0005865 | A1 | 1/2002 | Hayes-Roth |
| 2002/0133347 | A1 | 9/2002 | Schoneburg et al. |
| 2012/0259891 | A1 | 10/2012 | Edoja |
| 2014/0122619 | A1 | 5/2014 | Duan |
| 2016/0078127 | A1 | 3/2016 | Bhat et al. |
| 2016/0371317 | A1 | 12/2016 | Sharma et al. |
| 2017/0230312 | A1 | 8/2017 | Barrett et al. |
| 2018/0089322 | A1* | 3/2018 | DeLuca ............ G06F 16/24575 |
| 2019/0034780 | A1 | 1/2019 | Marin et al. |
| 2020/0312300 | A1* | 10/2020 | Yan ...................... G06N 3/0445 |

(Continued)

*Primary Examiner* — Antim G Shah
(74) *Attorney, Agent, or Firm* — Garg Law Firm, PLLC; Rakesh Garg Canaan; Rakesh Roy (57) ABSTRACT Using a natural language processing (NLP) engine executing in conjunction with a machine that is engaged in first natural language interaction, an analytics intent comprising an analysis type to be performed on a dataset is extracted from the first natural language interaction. Within the dataset, a subset of the dataset comprising data having above a threshold relevance measure with respect to the analytics intent is identified. From the subset, a knowledge graph modeling a set of relationships between data in the subset is constructed. Using the analytics intent and the knowledge graph, a conversational template is customized, augmenting the conversational template with a set of entities corresponding to the analytics intent. To obtain a result, the subset is analyzed using the knowledge graph. A second natural language interaction is presented via the machine, the presenting comprising transforming by the NLP engine the result to fit the customized conversational template.

17 Claims, 9 Drawing Sheets

(56) References Cited

U.S. PATENT DOCUMENTS

2021/0073474 A1\* 3/2021 Sengupta ................ H04L 51/02
2021/0192364 A1\* 6/2021 Wang ................... G06K 9/6276
2021/0201144 A1\* 7/2021 Jonnalagadda .......... G06N 3/08

\* cited by examiner

NATURAL LANGUAGE INTERACTION BASED DATA ANALYTICS

TECHNICAL FIELD

The present invention relates generally to a method, system, and computer program product for selecting and performing data analytics. More particularly, the present invention relates to a method, system, and computer program product for natural language interaction based data analytics.

BACKGROUND

A natural language is a scripted (written) or a vocalized (spoken) language having a form that is employed by humans for primarily communicating with other humans or with systems having a natural language interface. Natural language processing (NLP) is a technique that facilitates exchange of information between humans and data processing systems. For example, one branch of NLP pertains to transforming human readable or human understandable content into machine usable data. For example, NLP engines are presently usable to accept input content such as a newspaper article or human speech, and produce structured data, such as an outline of the input content, most significant and least significant parts, a subject, a reference, dependencies within the content, and the like, from the given content. Another branch of NLP pertains to cognitive analytics, the process of analyzing available information or knowledge to create, infer, deduce, or derive new information.

A chatbot is software that conducts a natural language conversation, or chat, with a human user. A user's input to the conversation is often in text form, but can also be converted from another modality, such as speech, into text for further processing by the chatbot software. The software's output is also often in text form, but can be converted back into speech a human can hear or another human-usable modality.

A message is a unit of conversation. A message is a portion of narrative text, or another form of narrative communication converted into narrative text, communicated from a user to a chatbot or vice versa. A message need not conform to a grammar, but may also be any natural language word or phrase. An interaction is a group of messages.

Chatbots are often structured around a pre-defined set of objectives, or intents, and entities. An objective or intent is the user's goal for the interaction with the chatbot. For example, "I'm hungry", "order pizza", and "buy a new pair of shoes" are all examples of an objective of ordering. An entity is a term that represents a real-world object, such as a person, place, or organization. For example, in the phrase "order pizza", "pizza" is an entity. Intents and entities need not be single words. For example, in a chatbot configured to process pizza orders, "mushrooms" and "green peppers" might be two entities.

To respond to a user's input, a chatbot relies on a dialog tree that specifies responses for specific combinations of objectives and intents. For example, if the chatbot recognizes that the user is asking about ordering the entity pizza, it might respond with a question about the type of crust he wants, prompt the user to specify a delivery address, and recognize a predefined set of entities corresponding to common pizza toppings. Together, an intent, set of entities, and a dialog tree constitute a conversation structure.

Data analytics, or analytics, is the discovery, interpretation, and communication of meaningful patterns in data, as well as applying data patterns in decision making. For example, businesses use analytics to plan and analyze marketing campaigns, understand the value and risk of components of an investment portfolio, analyze sensor data to determine how and where additional sensors should be deployed, and in many other tasks and subject areas.

SUMMARY

The illustrative embodiments provide a method, system, and computer program product. An embodiment includes a method that extracts, using a natural language processing (NLP) engine executing in conjunction with a machine that is engaged in first natural language interaction, from the first natural language interaction, an analytics intent comprising an analysis type to be performed on a dataset. An embodiment identifies, within the dataset, a subset of the dataset, the subset comprising data having above a threshold relevance measure with respect to the analytics intent. An embodiment constructs, from the subset, a knowledge graph, the knowledge graph modeling a set of relationships between data in the subset. An embodiment customizes, using the analytics intent and the knowledge graph, a conversational template, the customizing comprising augmenting the conversational template with a set of entities corresponding to the analytics intent. An embodiment analyzes, to obtain a result, the subset using the knowledge graph. An embodiment presents a second natural language interaction via the machine, the presenting comprising transforming by the NLP engine the result to fit the customized conversational template.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that adapting a chatbot to a new knowledge domain typically requires a human to define intents and entities, structure an appropriate dialog tree, optionally train the chatbot using example questions and answers, and test the completed adaptation. If multiple knowledge domains are to be supported, this process must be repeated for each domain.

The illustrative embodiments also recognize that many users would welcome assistance in performing and interpreting data analytics. Most analytics users are not trained data scientists, and are often unaware of which types of analyses are appropriate to which types of data, and how to select and perform analyses that actually answer users' questions. Thus, a chatbot or other natural language interaction mechanism would be helpful. However, because analytics are data dependent, each type of data or analysis represents an additional knowledge domain for which implementing a chatbot is time-consuming, error-prone, and difficult to adapt to additional data. Thus, the illustrative embodiments recognize that there is a need to implement a chatbot adapted to data analytics based on the data to be analyzed, in an automatic and data-dependent manner.

The illustrative embodiments recognize that the presently available tools or solutions do not address these needs or provide adequate solutions for these needs. The illustrative embodiments used to describe the invention generally address and solve the above-described problems and other problems related to natural language interaction based data analytics.

An embodiment can be implemented as a software application. The application implementing an embodiment can be configured as a modification of an existing chatbot or analytics system, as a separate application that operates in conjunction with an existing chatbot or analytics system, a standalone application, or some combination thereof.

Particularly, some illustrative embodiments provide a method that uses natural language interactions with a user to determine the user's analytics intent, identify a subset of a dataset having above a threshold relevance to the intent, analyze data in the subset, and present the result to the user.

An embodiment conducts a natural language interaction with a user. To conduct the interaction, an embodiment uses any presently-available interaction mechanism, for example converting a user's speech to text if necessary and processing the natural language text input. An embodiment responds to the user similarly, for example by generating natural language text and, if necessary, converting the text to another modality accessible to the user.

An embodiment extracts an analytics intent from a natural language interaction with a user. An analytics intent specifies an analysis type to be performed on a dataset. One non-limiting example of an analytics intent is to analyze customer records with respect to marketing campaigns. Another non-limiting example of an analytics intent is to evaluate year-to-date sales of a particular product as compared to sales of that product in previous years. To extract an analytics intent, an embodiment uses a natural language processing (NLP) engine executing in conjunction with a machine engaged in the natural language interaction.

The user need not specify the analysis type or dataset explicitly. One embodiment is configurable with a system-wide, user-specific, or user role-specific default dataset. For example, a user responsible for monitoring sales performance might have a default dataset of sales records. An embodiment is configurable to use, as the dataset, all data available to the user, anyone of the user's role, or all data available to the embodiment. Another embodiment is configurable to associate a particular intent or particular set of intents with a particular user. For example, a user whose job title is "marketing analyst" might have a default analytics intent of analyzing customer records with respect to marketing campaigns. Another embodiment is configurable to reuse an analytics intent, dataset, or both from a previous analytics session. For example, a user resuming work after lunch might simply specify a natural language phrase such as "resume from this morning".

An embodiment identifies, within the specified dataset, a subset including data having above a threshold relevance measure with respect to the analytics intent. For example, if the analytics intent is to evaluate year-to-date sales of a particular product as compared to sales of that product in previous years, sales data of other products, or products in a different family of products will be below a threshold relevance measure. An embodiment computes the relevance measure of data in the dataset using any presently-known technique. Limiting further analysis to a subset of the specified dataset allows an embodiment to spend computing resources on data that is likely to be of the most use in responding to a user's analytics intent.

An embodiment constructs a model of a set of relationships among portions of data in the subset, metadata relating to the data, results of analyses of the data, additional domain knowledge relating to the analytics intent, and data regarding the user. The model is an abstract representation of information, and is not limited to a statistical model. To construct the model, an embodiment organizes the information to be modelled using any data organization technique. Data regarding the user includes information about the user (e.g. the industry the user works in or the user's job title) and the user's previous interactions with an embodiment. In one embodiment, the model is a knowledge graph, i.e. a set of datapoints linked by relations that describe a domain. In another embodiment, the model is an ontology, i.e. a set of concepts and categories that shows their properties and relationships between them. In another embodiment, the model is implemented as a set of database tables. In another embodiment, the model is implemented in another form.

An embodiment analyzes data in the subset and metadata relating to the data to determine one or more analytics, or types of analyses, appropriate to the data, and adds the analytics to the model. In one embodiment, the analytics are based on a set of heuristics. For example, data that includes a set of measurements and a timestamp associated with each measurement is appropriate for analysis and prediction as a time series, while data that does not include a time element is not appropriate for a time series-based analysis.

An embodiment uses the analytics intent, analytics appropriate to the data, and the constructed model to predict a user's requests for analyses, performs the requests, and adds the results to the constructed model. For example, if the analytics intent is to analyze customer value within a dataset of transaction data, and analytics involving customer value are appropriate to the data in the dataset, an embodiment, having predicted that the user will request customer value analytics, performs a set of customer value analytics on the data and adds the results to the constructed model. Another embodiment waits to analyze data until the user actually makes a specific analytics request.

An embodiment uses the analytics intent and model to customize a conversational template, for use in interacting with the user regarding the modelled data. To customize the conversational template, an embodiment selects a dialog tree appropriate to the user's analytic intent and assembles a set of entities from fields of data in the model and known synonyms for those fields, thus generating a conversational structure for a further natural language interaction with the user about the analytics intent and the modelled data. Selecting a dialog tree appropriate to the user's analytic intent enables the embodiment to ask the user follow-up questions appropriate to the intent. For example, if the user's analytics intent is to explore customer value, the selected dialog tree might include a portion processing a user's request to determine which customers are in the most valuable group or groups. Assembling a set of entities from fields of data in the model allows both the embodiment and the user to refer to data fields during an interaction. For example, a user might refer to "the Midwest" or "the Midwest region". Because the embodiment has assembled a set of entities that associates the "Midwest" entity with a specific data field or set of fields, the embodiment recognizes the reference to the Midwest as referring to a specific geographical subset of transaction data.

An embodiment uses the conversational structure to conduct a second natural language interaction with the user, using the NLP engine. During the second natural language interaction, the embodiment suggests a type of analysis appropriate to the analytics intent and the data modelled by the model, analyzes the data using the suggested analysis or a user-specified analysis, and presents a result of the analysis to the user.

For presentation, an embodiment uses any presentation form suitable to the type of data in the result. For example, some result data might be best transformed by the NLP engine to be presented as a natural language answer to a user's natural language question, while other result data might be best presented in a graphical form, a video animation, or a virtual reality experience.

If appropriate, an embodiment adds analysis result data to the model. The added analysis result data is then usable to answer follow-up questions from the original user or another user, as well as for other purposes within an organization.

The manner of natural language interaction based data analytics described herein is unavailable in the presently available methods in the technological field of endeavor pertaining to performing data analytics. A method of an embodiment described herein, when implemented to execute on a device or data processing system, comprises substantial advancement of the functionality of that device or data processing system in extracting an analytics intent from a natural language interaction using an NLP engine, identifying a subset of a dataset having above a threshold relevance measure with respect to the analytics intent, constructing a model of relationships between data in the subset, using the analytics intent and the model to customized a conversational template by augmenting the conversational template with a set of entities corresponding to the analytics intent, analyzing the subset using the model, and using a second natural language interaction to present an analysis result via the NLP engine.

The illustrative embodiments are described with respect to certain types of natural language interactions, entities, intents, objectives, models, knowledge graphs, analytics, analyses, relevance measures, data types, predictions, thresholds, responses, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
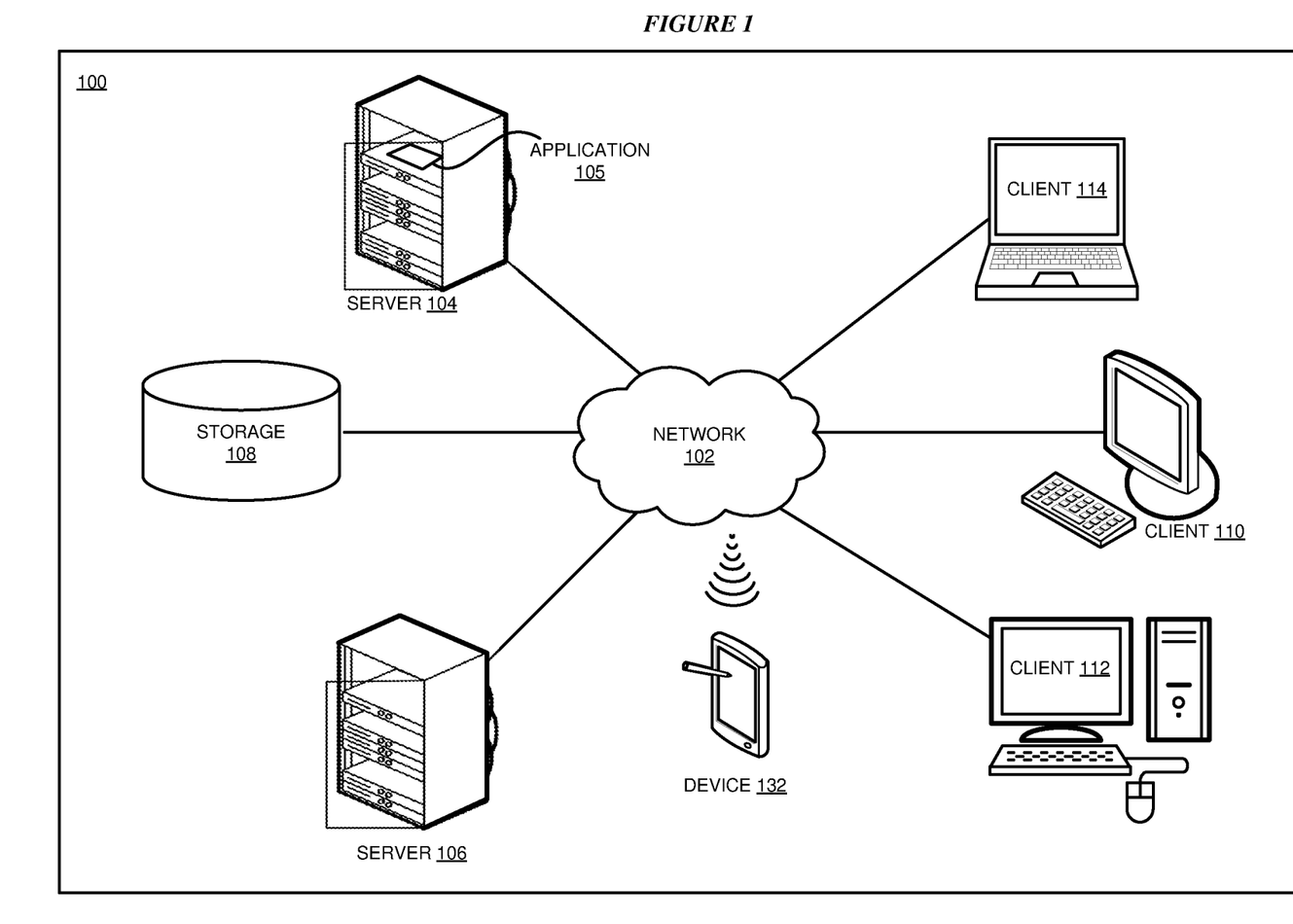
FIG. 1 depicts a block diagram of a network of data processing systems in which illustrative embodiments may be implemented.
Figure 2:
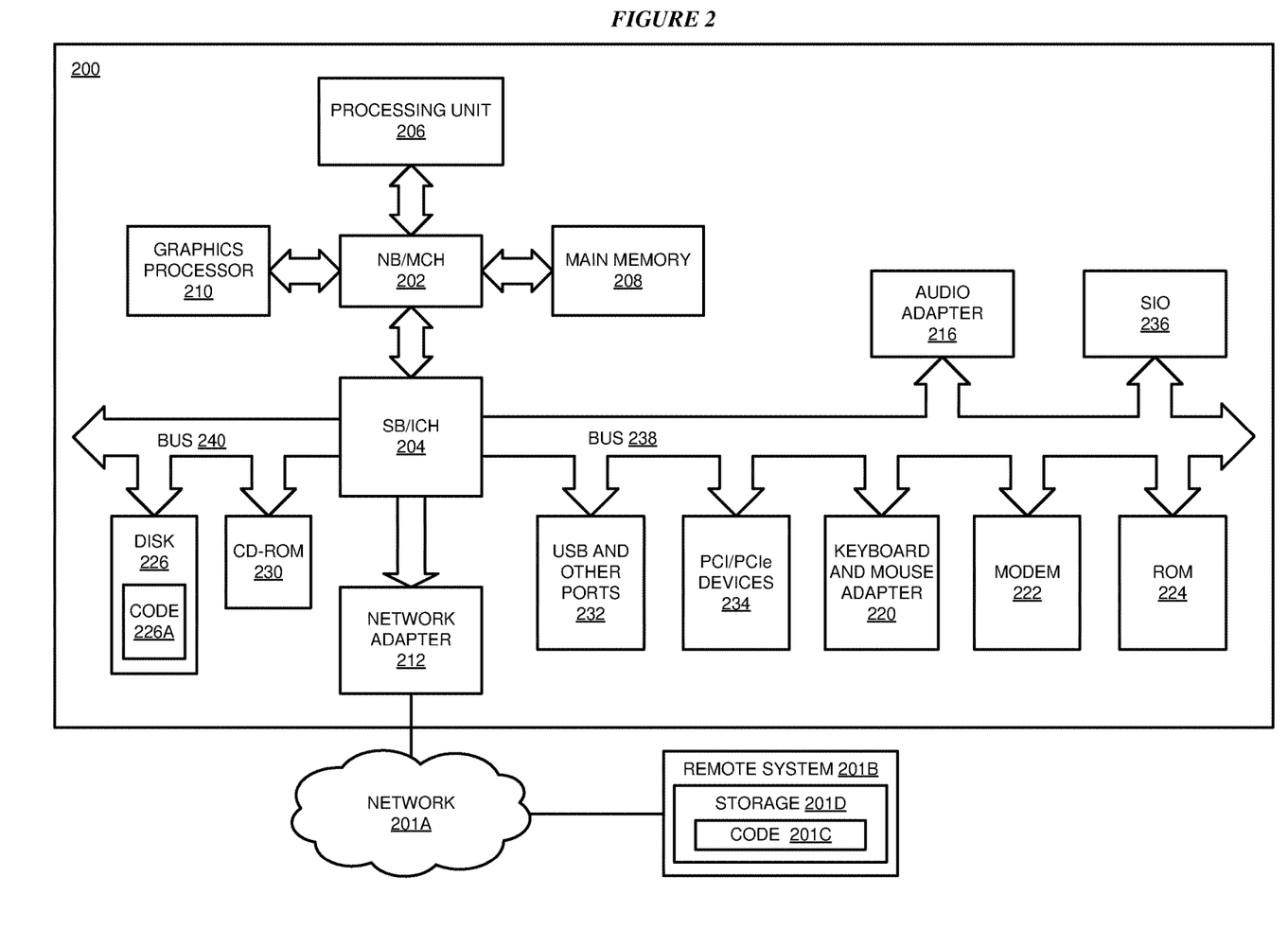
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. In addition, application 105 interacts with a user using any modality, for example via a microphone and a speaker installed in device 132, via a text entry method and display screen installed in any of clients 110, 112, and 114, and device 132, or via another user interface.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
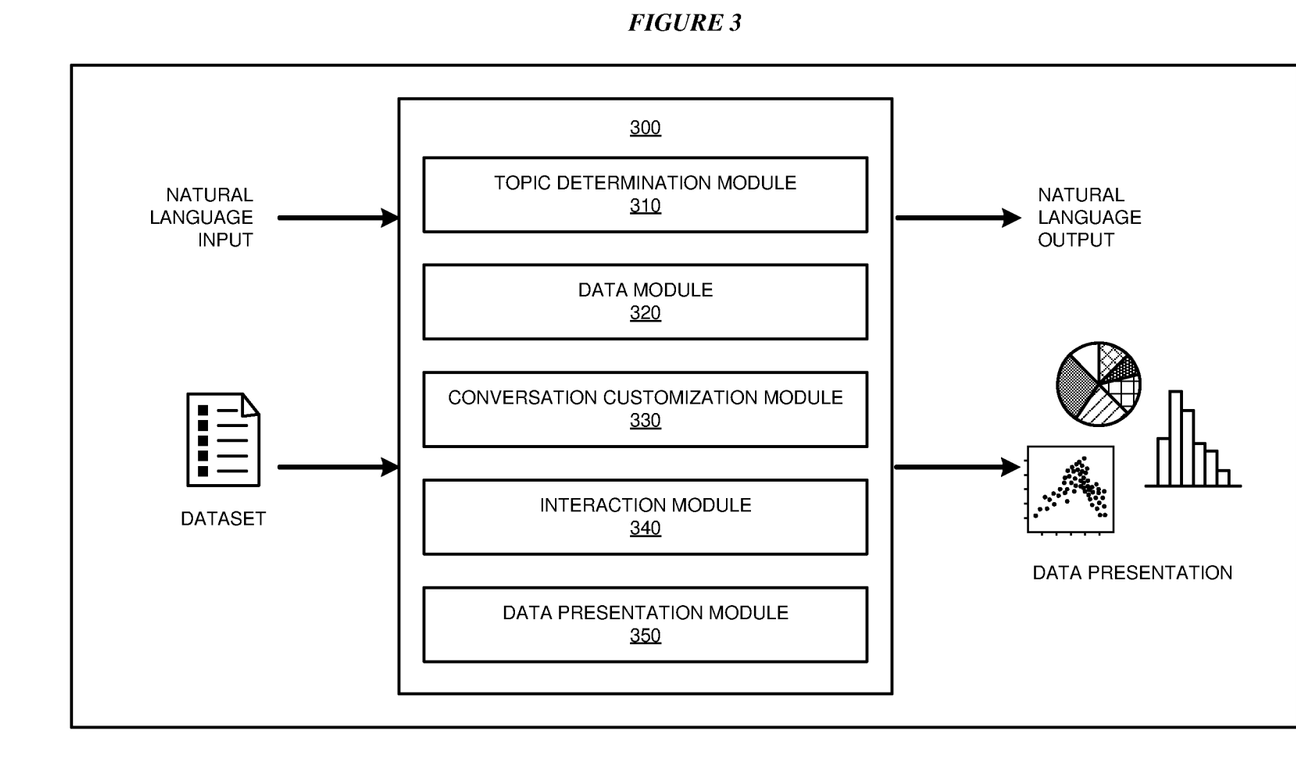
FIG. 3 depicts a block diagram of an example configuration for natural language interaction based data analytics in accordance with an illustrative embodiment.

With reference to FIG. 3, this figure depicts a block diagram of an example configuration for natural language interaction based data analytics in accordance with an illustrative embodiment. Application 300 is an example of application 105 in FIG. 1 and executes in any of servers 104 and 106, clients 110, 112, and 114, and device 132 in FIG. 1.

Interaction module 340 conducts natural language interactions with a user, using any interaction modality described herein. Topic determination module 310 extracts an analytics intent from a natural language interaction with a user. To extract an analytics intent, module 310 uses an NLP engine. The user need not specify the analysis type or dataset explicitly. Implementations of module 310 are configurable with one or more of a system-wide, user-specific, or user role-specific default dataset. Module 310 is configurable to use, as the dataset, all data available to the user, anyone of the user's role, or all data available to the embodiment. Module 310 is configurable to associate a particular intent or particular set of intents with a particular user. Module 310 is configurable to reuse an analytics intent, dataset, or both from a previous analytics session.

Data module 320 identifies, within the specified dataset, a subset including data having above a threshold relevance measure with respect to the analytics intent. Module 320 computes the relevance measure of data in the dataset using any presently-known technique. Limiting further analysis to a subset of the specified dataset allows an embodiment to spend computing resources on data that is likely to be of the most use in responding to a user's analytics intent.

Module 320 constructs a model, e.g. a knowledge graph, of a set of relationships among portions of data in the subset, metadata relating to the data, results of analyses of the data, and data regarding the user. Data regarding the user includes information about the user (e.g. the industry the user works in or the user's job title) and the user's previous interactions with application 300. Module 320 analyzes data in the subset and metadata relating to the data to determine one or more analytics appropriate to the data, and adds the analytics to the model. In one implementation of module 320, the analytics are based on a set of heuristics. One implementation of module 320 uses the analytics intent, types of analyses appropriate to the data, and the constructed model to predict a user's requests for analyses, performs the requests, and adds the results to the constructed model. Another implementation of module 320 waits to analyze data until the user actually makes a specific analytics request.

Conversational customization module 330 uses the analytics intent and model to customize a conversational template, for use in interacting with the user regarding the modelled data. To customize the conversational template, module 330 selects a dialog tree appropriate to the user's analytic intent and assembles a set of entities from fields of data in the model and known synonyms for those fields, thus generating a conversational structure for a further natural language interaction with the user about the analytics intent and the modelled data. Selecting a dialog tree appropriate to the user's analytic intent enables application 300 to ask the user follow-up questions appropriate to the intent. Assembling a set of entities from fields of data in the model allows both application 300 and the user to refer to data fields during an interaction.

Interaction module 340 uses the conversational structure to conduct a second natural language interaction with the user. During the second natural language interaction, module 340 uses data module 320 to suggest a type of analysis appropriate to the analytics intent and the data modelled by the model and analyzes the data using the suggested analysis or a user-specified analysis. Data presentation module 350 presents a result of the analysis to the user. For presentation, module 350 uses any presentation form suitable to the type of data in the result.

Figure 4:
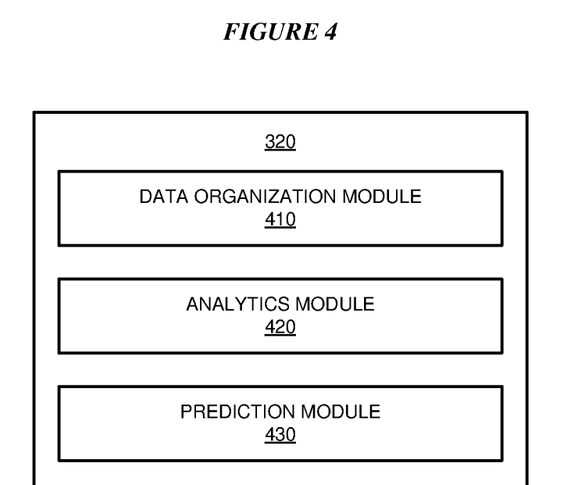
FIG. 4 depicts a block diagram of an example configuration for natural language interaction based data analytics in accordance with an illustrative embodiment.

With reference to FIG. 4, this figure depicts a block diagram of an example configuration for natural language interaction based data analytics in accordance with an illustrative embodiment. FIG. 4 depicts more detail of data module 320 in FIG. 3.

Data organization module 410 organizes the information to be modelled using any data organization technique. Analytics module 420 analyzes data in the subset and metadata relating to the data to determine one or more analytics appropriate to the data, and adds the analytics to the model. In one embodiment, the analytics are based on a set of heuristics. Prediction module 430 uses the analytics intent, analytics appropriate to the data, and the constructed model to predict a user's requests for analyses, performs the requests, and adds the results to the constructed model.

Figure 5:
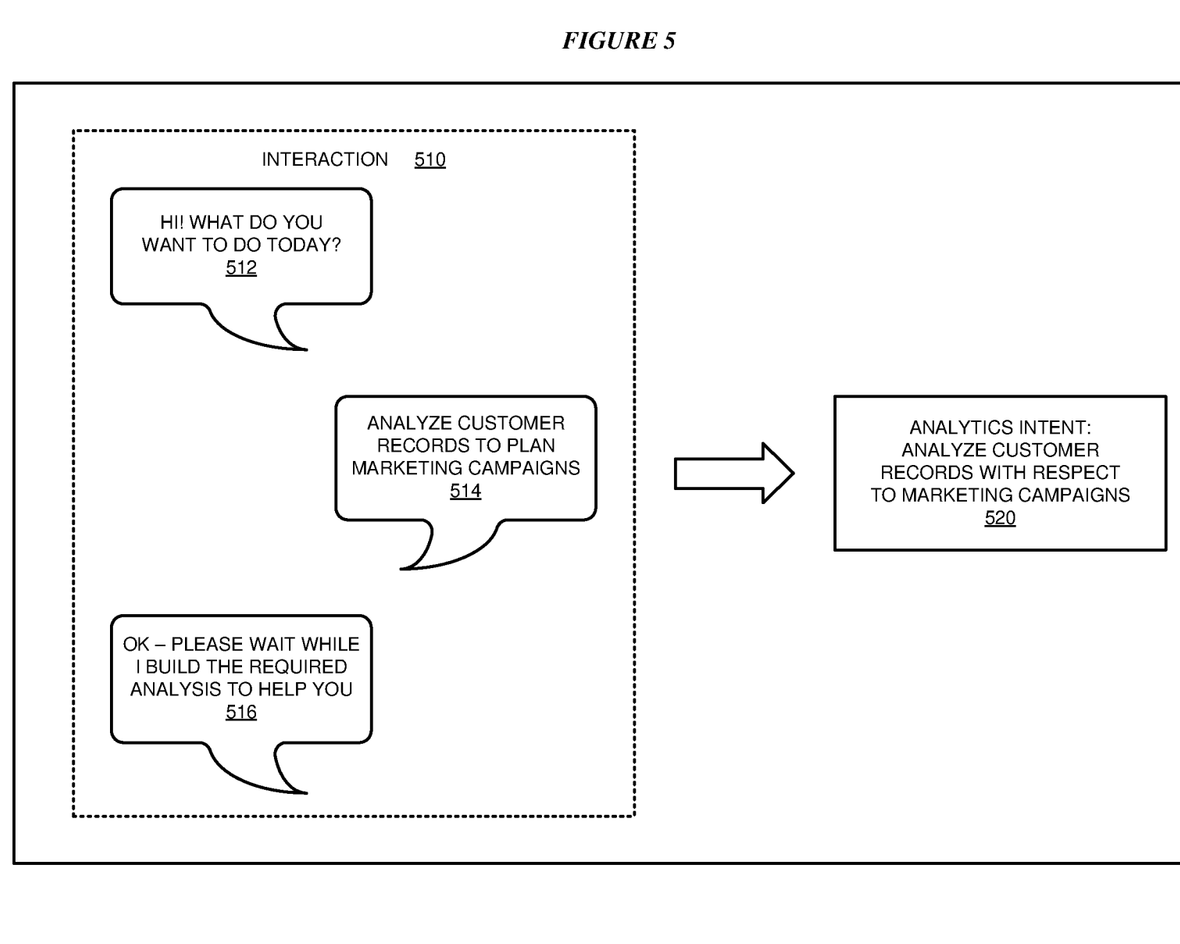
FIG. 5 depicts an example of natural language interaction based data analytics in accordance with an illustrative embodiment.

With reference to FIG. 5, this figure depicts an example of natural language interaction based data analytics in accordance with an illustrative embodiment. The example can be executed using application 300 in FIG. 3.

Natural language interaction 510 includes messages 512, 514, and 516. Within interaction 510, in message 512 application 300 elicits a topic statement from a user. In message 514, the user provides a topic statement. In message 516, application 300 acknowledges the topic statement. If the user's answer were ambiguous or insufficiently detailed, instead of the acknowledgement in message 516 the application would use additional natural language messages to elicit the required clarity or details. From interaction 510, application 300 extracts analytics intent 520.

Figure 6:
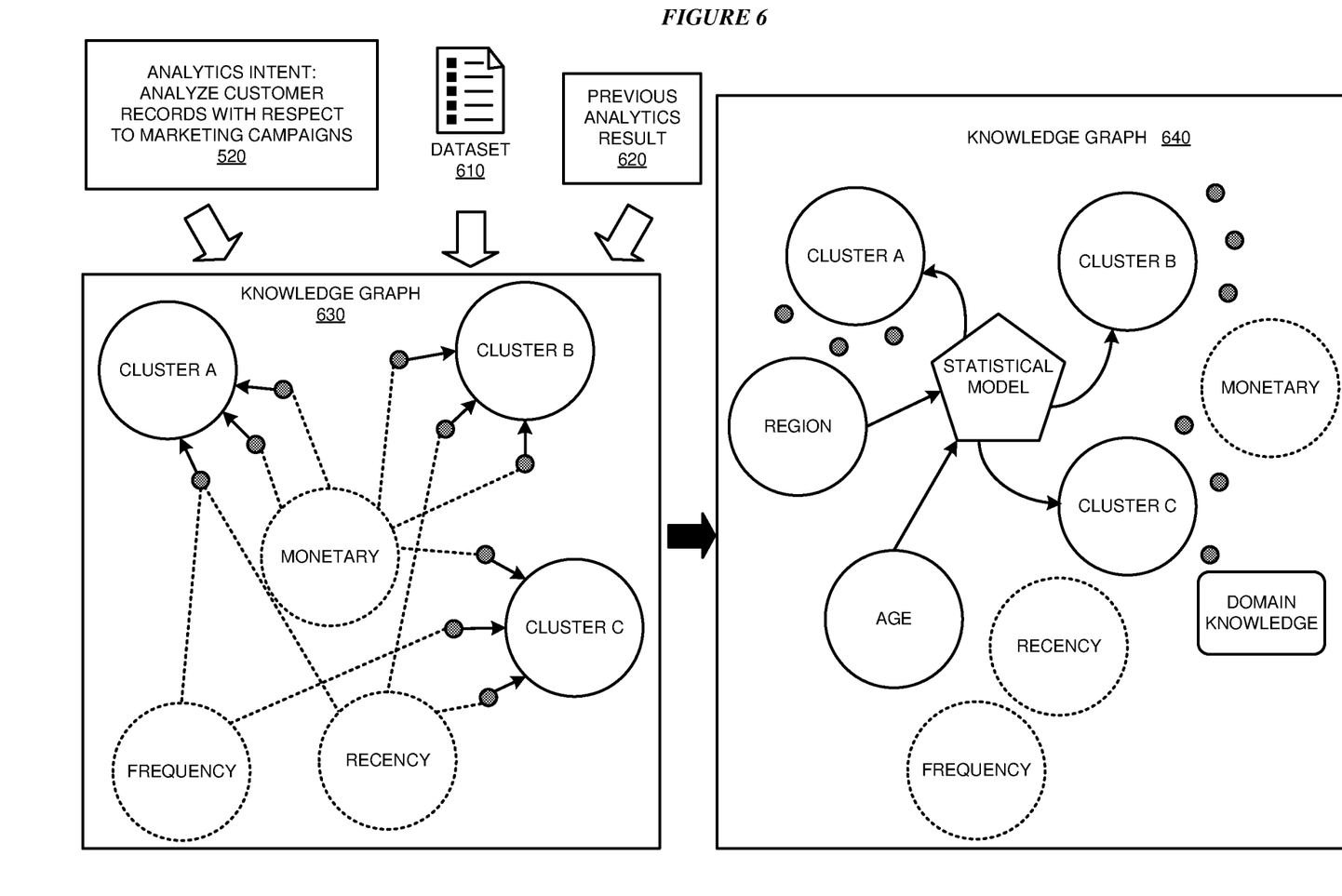
FIG. 6 depicts a continued example of natural language interaction based data analytics in accordance with an illustrative embodiment.

With reference to FIG. 6, this figure depicts a continued example of natural language interaction based data analytics in accordance with an illustrative embodiment. The example can be executed using application 300 in FIG. 3. Analytics intent 520 is the same as analytics intent 520 in FIG. 5.

As depicted, application 300 uses analytics intent 520, dataset 610, and previous analytics result 620 to construct knowledge graph 630 by organizing the information to be modelled. In particular, because analytics intent 520 comprises analyzing customer records with respect to marketing campaigns, in knowledge graph 630 frequency, monetary, and recency data are organized into clusters corresponding to regions. In marketing data, frequency refers to the number of purchases a customer makes at a business, monetary refers to the average amount of money a customer spends in a transaction with the business, and recency refers to the number of days (or another time unit) since the customer's last transaction.

Knowledge graph 640 depicts results of application 300's determination one or more types of analyses appropriate to the data, and adds the types of analyses to the model. As depicted, knowledge graph 640 includes a statistical model of recency, frequency, and monetary by region, to determine if any of these values differ by region and if there are unusually high or low values for any region. Knowledge graph 640 also includes additional domain knowledge such as a set of standard marketing campaign recommendations that can be applied to modelled data.

Figure 7:
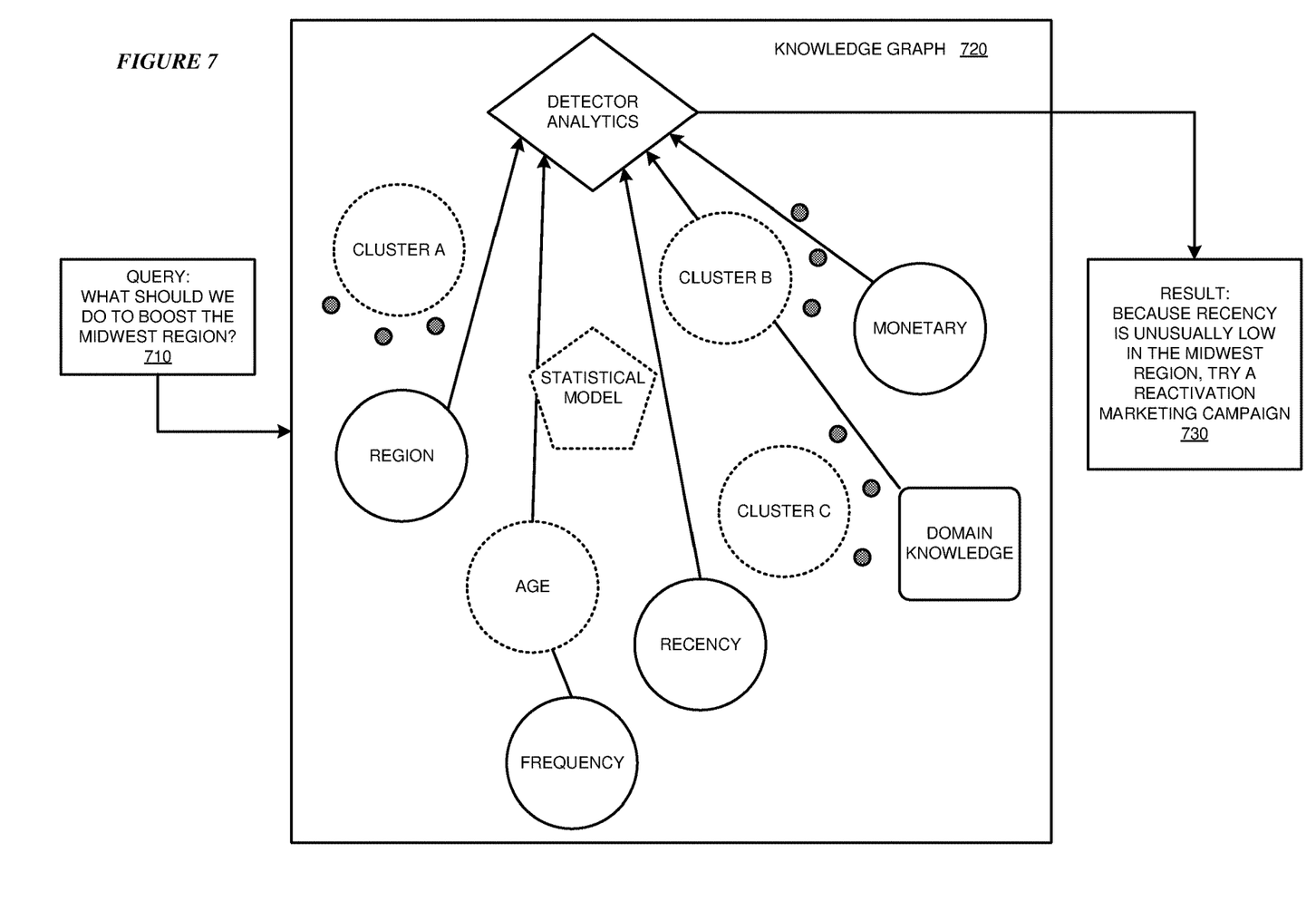
FIG. 7 depicts a continued example of natural language interaction based data analytics in accordance with an illustrative embodiment.

With reference to FIG. 7, this figure depicts a continued example of natural language interaction based data analytics in accordance with an illustrative embodiment. The example can be executed using application 300 in FIG. 3.

In particular, the example depicts using knowledge graph 720 to answer natural language query 710. Because the query asks specifically about the Midwest region, application 300 has performed detector analytics for Midwest region data, and added those to knowledge graph 720. Then application 300 uses the information modelled in knowledge graph 720 to generate and present result 730.

Figure 8:
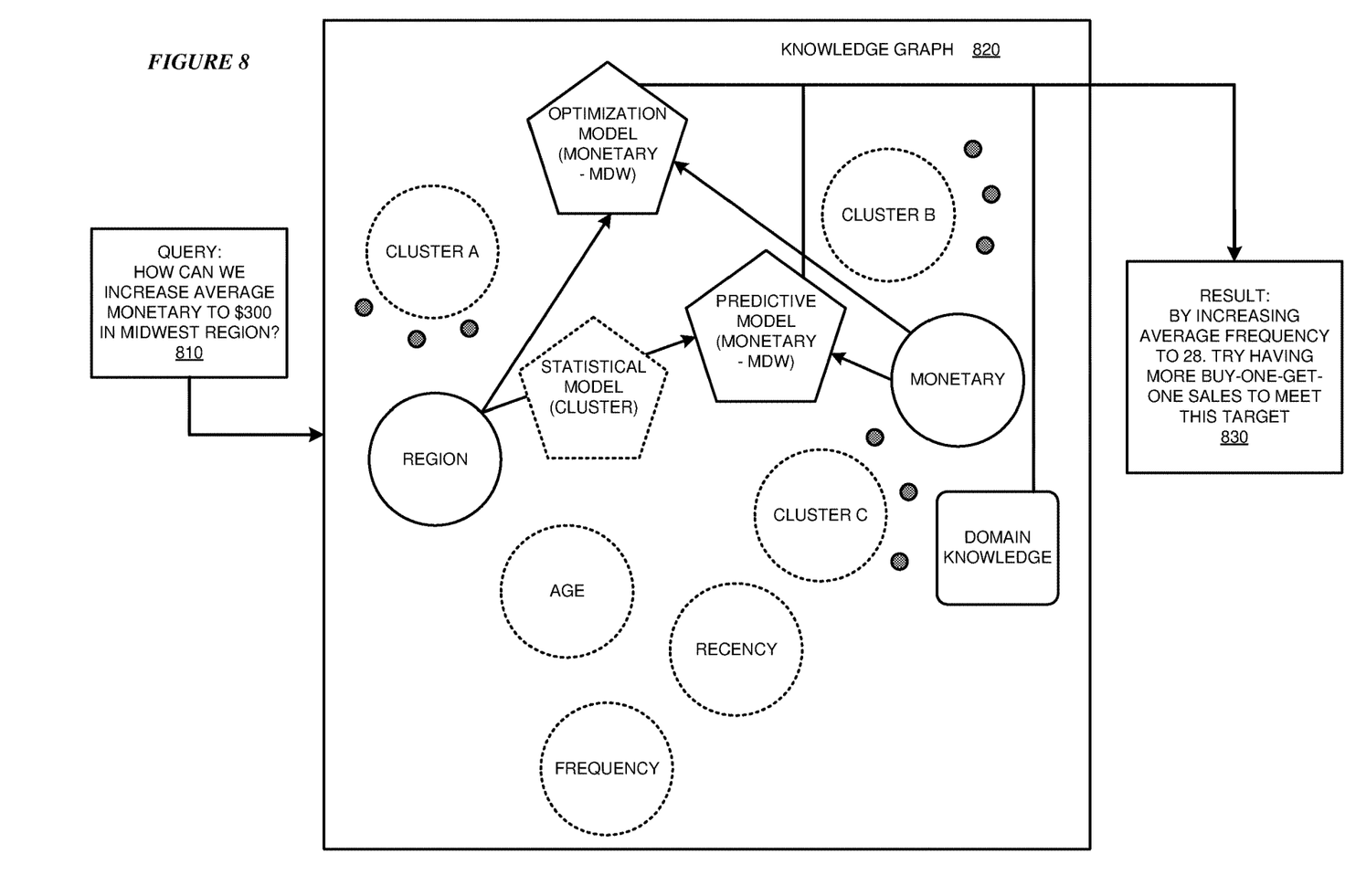
FIG. 8 depicts a continued example of natural language interaction based data analytics in accordance with an illustrative embodiment.

With reference to FIG. 8, this figure depicts a continued example of natural language interaction based data analytics in accordance with an illustrative embodiment. The example can be executed using application 300 in FIG. 3.

In particular, the example depicts using knowledge graph 820 to answer natural language query 810. Because the query asks specifically about the Midwest region, application 300 has constructed an optimization model and a predictive model for monetary in the Midwest region, and added those to knowledge graph 820. Then application 300 uses the information modelled in knowledge graph 820 to generate and present result 830.

Figure 9:
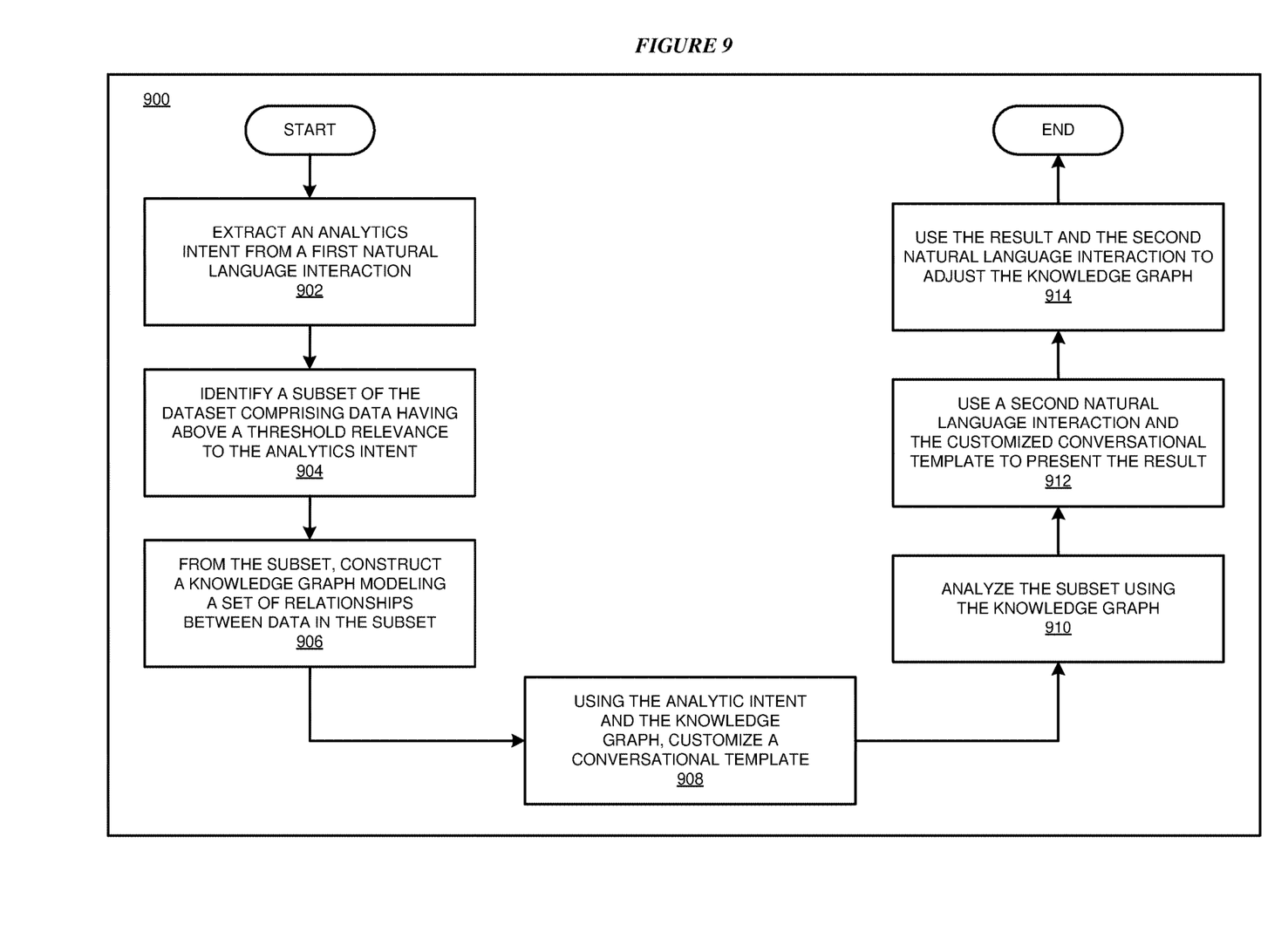
FIG. 9 depicts a flowchart of an example process for natural language interaction based data analytics in accordance with an illustrative embodiment.

With reference to FIG. 9, this figure depicts a flowchart of an example process for natural language interaction based data analytics in accordance with an illustrative embodiment. Process 900 can be implemented in application 300 in FIG. 3.

In block 902, the application extracts an analytics intent from a first natural language interaction. In block 904, the application identifies a subset of the dataset comprising data having above a threshold relevance to the analytics intent. In block 906, the application, from the subset, constructs a knowledge graph modeling a set of relationships between data in the subset. In block 908, the application uses the analytic intent and the knowledge graph to customize a conversational template. In block 910, the application analyzes the subset using the knowledge graph. In block 912, the application uses a second natural language interaction and the customized conversational template to present the result. In block 914, the application uses the result and the second natural language interaction to adjust the knowledge graph. Then the application ends.

Thus, a computer implemented method, system or apparatus, and computer program product are provided in the illustrative embodiments for natural language interaction based data analytics and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
extracting, using a natural language processing (NLP) engine executing in conjunction with a machine that is engaged in first natural language interaction, from the first natural language interaction, an analytics intent comprising an analysis type to be performed on a dataset;
identifying, within the dataset, a subset of the dataset, the subset comprising data having above a threshold relevance measure with respect to the analytics intent;
constructing, from the subset, a knowledge graph, the knowledge graph modeling a set of relationships between data in the subset;
customizing, using the analytics intent and the knowledge graph, a conversational template, the customizing comprising augmenting the conversational template with a set of entities corresponding to the analytics intent;
determining, by analyzing data in the subset and metadata of the subset, a type of data in the subset;
selecting, according to the type of data, an analytic, the analytic comprising a type of data analysis;
analyzing, using the analytic and the knowledge graph to obtain a result, the subset;
presenting a second natural language interaction via the machine, the presenting comprising transforming by the NLP engine the result to fit the customized conversational template;
predicting, using data in the subset, metadata of the subset, and the analytic, a predicted analysis request;
analyzing, according to the predicted analysis request to obtain a second result, the subset using the knowledge graph; and
adding, to the knowledge graph, the second result.

2. The computer-implemented method of claim 1, wherein constructing the knowledge graph comprises organizing data in the subset.

3. The computer-implemented method of claim 1, wherein constructing the knowledge graph comprises:
adding, to the knowledge graph, the analytic.

4. The computer-implemented method of claim 1, wherein the customizing further comprises selecting a dialog tree corresponding to the analytics intent.

5. The computer-implemented method of claim 1, further comprising:
adjusting, using the result and the second natural language interaction, the knowledge graph.

6. A computer usable program product comprising one or more computer-readable storage devices, and program instructions stored on at least one of the one or more storage devices, the stored program instructions comprising:
program instructions to extract, using a natural language processing (NLP) engine executing in conjunction with a machine that is engaged in first natural language interaction, from the first natural language interaction, an analytics intent comprising an analysis type to be performed on a dataset;
program instructions to identify, within the dataset, a subset of the dataset, the subset comprising data having above a threshold relevance measure with respect to the analytics intent;
program instructions to construct, from the subset, a knowledge graph, the knowledge graph modeling a set of relationships between data in the subset; program instructions to customize, using the analytics intent and the knowledge graph, a conversational template, the customizing comprising augmenting the conversational template with a set of entities corresponding to the analytics intent;
program instructions to determine, by analyzing data in the subset and metadata of the subset, a type of data in the subset;
program instructions to select, according to the type of data, an analytic, the analytic comprising a type of data analysis;
program instructions to analyze, using the analytic and the knowledge graph to obtain a result, the subset using the knowledge graph;
program instructions to present a second natural language interaction via the machine, the presenting comprising transforming by the NLP engine the result to fit the customized conversational template;
program instructions to predict, using data in the subset, metadata of the subset, and the analytic, a predicted analysis request;
program instructions to analyze, according to the predicted analysis request to obtain a second result, the subset using the knowledge graph; and
program instructions to add, to the knowledge graph, the second result.

7. The computer usable program product of claim 6, wherein program instructions to construct the knowledge graph comprises program instructions to organize data in the subset.

8. The computer usable program product of claim 6, wherein program instructions to construct the knowledge graph comprises:
program instructions to add, to the knowledge graph, the analytic.

9. The computer usable program product of claim 6, wherein the customizing further comprises selecting a dialog tree corresponding to the analytics intent.

10. The computer usable program product of claim 6, further comprising:
program instructions to adjust, using the result and the second natural language interaction, the knowledge graph.

11. The computer usable program product of claim 6, wherein the stored program instructions are stored in the at least one of the one or more storage devices of a local data processing system, and wherein the stored program instructions are transferred over a network from a remote data processing system.

12. The computer usable program product of claim 6, wherein the stored program instructions are stored in the at least one of the one or more storage devices of a server data processing system, and wherein the stored program instructions are downloaded over a network to a remote data processing system for use in a computer readable storage device associated with the remote data processing system.

13. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to extract, using a natural language processing (NLP) engine executing in conjunction with a machine that is engaged in first natural language interaction, from the first natural language interaction, an analytics intent comprising an analysis type to be performed on a dataset;

program instructions to identify, within the dataset, a subset of the dataset, the subset comprising data having above a threshold relevance measure with respect to the analytics intent;

program instructions to construct, from the subset, a knowledge graph, the knowledge graph modeling a set of relationships between data in the subset; program instructions to customize, using the analytics intent and the knowledge graph, a conversational template, the customizing comprising augmenting the conversational template with a set of entities corresponding to the analytics intent;

program instructions to determine, by analyzing data in the subset and metadata of the subset, a type of data in the subset; program instructions to select, according to the type of data, an analytic, the analytic comprising a type of data analysis;

program instructions to analyze, using the analytic and the knowledge graph to obtain a result, the subset using the knowledge graph;

program instructions to present a second natural language interaction via the machine, the presenting comprising transforming by the NLP engine the result to fit the customized conversational template;

program instructions to predict, using data in the subset, metadata of the subset, and the analytic, a predicted analysis request;

program instructions to analyze, according to the predicted analysis request to obtain a second result, the subset using the knowledge graph; and program instructions to add, to the knowledge graph, the second result.

14. The computer system of claim 13, wherein program instructions to construct the knowledge graph comprises program instructions to organize data in the subset.

15. The computer system of claim 13, wherein program instructions to construct the knowledge graph comprises:

program instructions to add, to the knowledge graph, the analytic.

16. The computer system of claim 13, wherein the customizing further comprises selecting a dialog tree corresponding to the analytics intent.

17. The computer system of claim 13, further comprising:

program instructions to adjust, using the result and the second natural language interaction, the knowledge graph.

* * * * *